United States Patent
Zhang

(10) Patent No.: US 10,141,848 B2
(45) Date of Patent: Nov. 27, 2018

(54) INTERLEAVED POWER FACTOR CORRECTOR

(71) Applicant: MIDEA GROUP CO., LTD., Foshan (CN)

(72) Inventor: Guozhu Zhang, Foshan (CN)

(73) Assignee: MIDEA GROUP CO., LTD., Foshan (CN)

( * ) Notice: Subject to any disclaimer, the term of this patent is extended or adjusted under 35 U.S.C. 154(b) by 75 days.

(21) Appl. No.: 15/325,522

(22) PCT Filed: Oct. 21, 2014

(86) PCT No.: PCT/US2014/089081
§ 371 (c)(1),
(2) Date: Jan. 11, 2017

(87) PCT Pub. No.: WO2016/004700
PCT Pub. Date: Jan. 14, 2016

(65) Prior Publication Data
US 2018/0226891 A1    Aug. 9, 2018

(30) Foreign Application Priority Data

Jul. 11, 2014  (CN) .......................... 2014 1 0331998

(51) Int. Cl.
*H02M 3/158*  (2006.01)
*H02M 3/335*  (2006.01)
*H02M 1/42*   (2007.01)

(52) U.S. Cl.
CPC ....... *H02M 3/1584* (2013.01); *H02M 1/4225* (2013.01); *H02M 3/335* (2013.01)

(58) Field of Classification Search
CPC .... H02M 3/156–3/158; H02M 3/1584; H02M 3/33507; H02M 3/33523;
(Continued)

(56) References Cited

U.S. PATENT DOCUMENTS 8,247,997 B2 *  8/2012  Liess ................. H05B 41/2985
                                                        315/210
8,310,371 B2 * 11/2012  Dai .......................... H02H 3/20
                                                        340/650
(Continued)

FOREIGN PATENT DOCUMENTS

CN    101217255 A    7/2008
CN    103532367 A    1/2014
(Continued)

OTHER PUBLICATIONS

Office action from SIPO dated Oct. 30, 2015 for CN application 201410331998.3; 7 pages.
(Continued)

*Primary Examiner* — Yemane Mehari
(74) *Attorney, Agent, or Firm* — Lathrop Gage LLP

(57) ABSTRACT

An interleaved power factor corrector includes a first PFC component, a second PFC component, a current sampling resistor, a current detection component, a voltage detection component, and a control component. The current detection component is configured to detect a current I1, a current I2 and a current Iin. The voltage detection component is configured to detect a voltage U1 inputted into the interleaved power factor corrector and an output voltage U2. The control component is configured to generate, according to the current I1, current I2, current Iin, voltage U1, voltage U2 and a preset target output voltage, a first PWM control signal and a second PWM control signal, in which the first PWM control signal is different from the second PWM control signal by a half of a carrier period. The interleaved power factor corrector has lower circuit cost.

13 Claims, 4 Drawing Sheets

(58) Field of Classification Search
CPC ......... H02M 3/33569; H02M 3/33592; H02M 1/4225; Y02B 70/126
USPC ................. 323/202, 222, 268, 272, 283–285
See application file for complete search history.

(56) References Cited

U.S. PATENT DOCUMENTS

| | | | | |
|---|---|---|---|---|
| 8,860,251 | B2* | 10/2014 | Lin .......................... | H02J 9/061 307/70 |
| 2005/0036337 | A1 | 2/2005 | Zhang et al. | |
| 2007/0115695 | A1* | 5/2007 | Lou ..................... | H02M 3/1582 363/16 |
| 2008/0129260 | A1 | 6/2008 | Jaber et al. | |
| 2013/0194848 | A1 | 8/2013 | Gabriele et al. | |
| 2014/0009978 | A1* | 1/2014 | Brinlee ............... | H02M 1/4225 363/25 |
| 2014/0169049 | A1* | 6/2014 | Chandrasekaran . | H02M 1/4225 363/84 |

FOREIGN PATENT DOCUMENTS

| | | |
|---|---|---|
| CN | 103872895 A | 6/2014 |
| CN | 203645381 U | 6/2014 |

OTHER PUBLICATIONS

Office action from SIPO dated Jun. 14, 2016 for CN application 201410331998.3, 6 pages.
Office action from SIPO dated Nov. 25, 2016 for CN application 201410331998.3, 7 pages.
International Search Report and Written Opinion of PCT application No. PCT/CN2014/089081, dated Apr. 9, 2015, 8 pages.
English Translation of office action from SIPO dated Oct. 30, 2015 for CN application 201410331998.3, 5 pages.
English translation of office action from SIPO dated Jun. 14, 2016 for CN application 201410331998.3, 6 pages.
English translation of office action from SIPO dated Nov. 25, 2016 for CN application 201410331998.3, 5 pages.
English translation of International Search Report for PCT application No. PCT/CN2014/089081, dated Apr. 9, 2015, 2 pages.
English Translation of the Written Opinion of the International Search Authority for PCT application No. PCT/CN2014/089081, dated Apr. 9, 2015, 7 pages.
European Patent Application No. 14897047.8 extended Search and Opinion dated Mar. 22, 2018, 7 pages.

* cited by examiner

INTERLEAVED POWER FACTOR CORRECTOR

CROSS REFERENCE TO RELATED APPLICATION

This application is a U.S. national phase of International Application Serial No. PCT/CN2014/089081, filed on Oct. 21, 2016, which is based upon and claims priority and benefits of Chinese Patent Application Serial No. 201410331998.3, filed with State Intellectual Property Office on Jul. 11, 2014, the entire content of which is incorporated herein by reference.

FIELD

The present disclosure relates to field of circuit technology, and more particularly, to an interleaved power factor corrector.

BACKGROUND

In order to reduce pollution of current harmonic and reactive power generated by an electric device to the power grid, the current harmonic of the electric device needs to meet certain harmonic standards. In order to meet the harmonic standards, the electric device needs to carry on power factor correction (PFC for short). In this context, various power factor correction technologies have been proposed and applied to the electric device.

The interleaved PFC solution is receiving more and more attention because of small harmonic current and high reliability. The current interleaved PFC solution usually uses a two-way symmetrical boost-type circuit structure. Although the circuit structure is symmetrical, it may still cause current imbalance of the two-way symmetrical boost-type circuit structure because of component differences such as differences between inductors, resulting in too large current of one switch tube. When the current of the switch tube reaches a certain level, it may burn out the switch tube, making the whole circuit failure. Therefore, the interleaved PFC solution also carries on current balance control on two switch tubes in addition to carrying on the power factor correction.

In the related art, two following solutions are proposed to realize the current balance control on the two-way switch tubes. The first solution proposes a power factor correction device for sampling a total current of the two-way symmetrical boost-type circuit, and a current of one circuit in the two-way symmetrical boost-type circuit. The power factor correction device uses a difference between the total current of the two-way symmetrical boost-type circuit and the current of the one circuit in the two-way symmetrical boost-type circuit as an estimated value of the other one circuit in the two-way symmetrical boost-type circuit, and carries on the current balance control on the two-way switch tubes based on the estimated value. The second solution proposes an interleaved PFC solution for sampling currents on the two switch tubes respectively. This solution may calculate a duty ratio of the switch tube and achieve current balance without sampling the total current of the two-way symmetrical boost-type circuit.

However, both of the above-mentioned related technologies require at least two current sensors to realize the interleaved PFC solution for performing the current balance on the two switch tubes. Therefore, the circuit cost is high.

SUMMARY

Embodiments of the present disclosure provide an interleaved power factor corrector. The interleaved power factor corrector includes: a first PFC component including a first energy storage inductor, a first switch component and a first fast recovery diode; a second PFC component, parallel to the first PFC component and including a second energy storage inductor, a second switch component and a second fast recovery diode, in which the second switch component is connected to the first switch component and a first node is between the second switch component and the first switch component; a current sampling resistor, in which a first terminal of the current sampling resistor is connected to the first node and a second terminal of the current sampling resistor is grounded; a current detection component, connected to the first node and configured to detect a current I1 flowing through the first switch component, to detect a current I2 flowing through the second switch component and to detect a current Iin flowing through the first switch component and the second switch component, each detection is based on a sampling signal generated by the current sampling resistor; a voltage detection component, configured to detect a voltage U1 inputted into the interleaved power factor corrector and an output voltage U2 of the interleaved power factor corrector; and a control component, connected to the current detection component, the voltage detection component, a control terminal of the first switch component and a control terminal of the second switch component respectively and configured to generate a first pulse-width modulation PWM control signal for controlling the first switch component and a second PWM control signal for controlling the second switch component based on the current I1, the current I2, the current Iin, the voltage U1, the voltage U2 and a preset target output voltage, in which the first PWM control signal is different from the second PWM control signal by a half of a carrier period.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
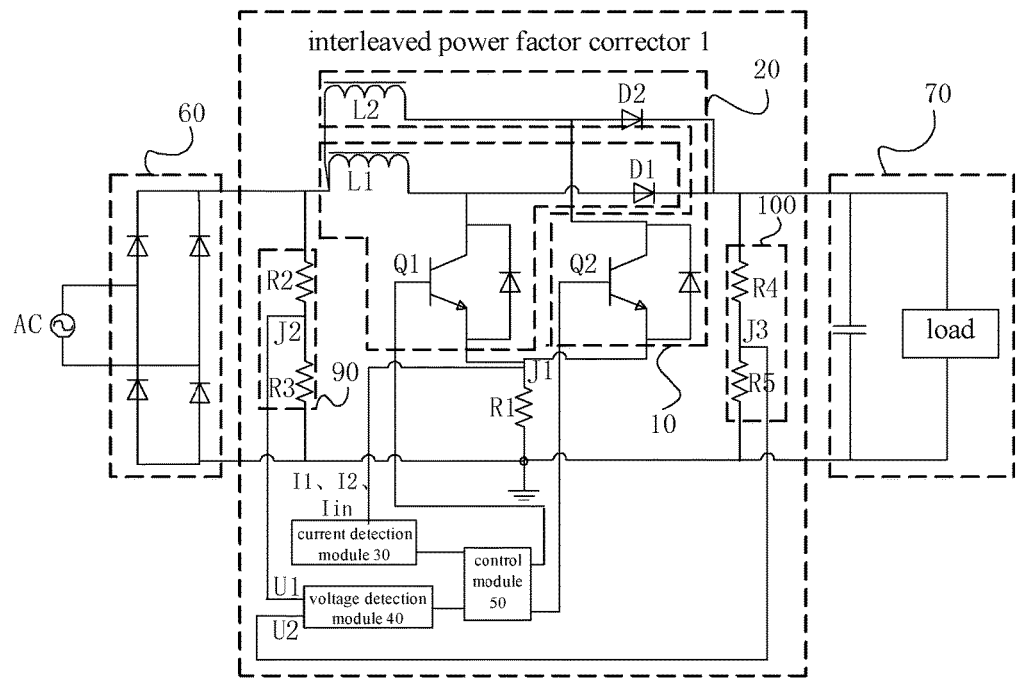
FIG. 1 is a schematic diagram illustrating an interleaved power factor corrector according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied. Moreover, a structure in which a first feature is "on" a second feature may include an embodiment in which the first feature directly contacts the second feature, and may also include an embodiment in which an additional feature is formed between the first feature and the second feature so that the first feature does not directly contact the second feature.

In the description of the present disclosure, it should be noted that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

An interleaved power factor corrector 1 provided by embodiments of the present disclosure will be described with reference to the accompanying drawings as follows.

As shown in FIG. 1, the interleaved power factor corrector 1 according to embodiments of the present disclosure includes a first PFC component 10, a second PFC component 20, a current sampling resistor R1, a current detection component 30, a voltage detection component 40 and a control component 50 (for example, a Micro Control Unit).

The first PFC component 10 includes a first energy storage inductor L1, a first switch component Q1 and a first fast recovery diode D1. The second PFC component 20 is parallel to the first PFC component 10. The second PFC component 20 includes a second energy storage inductor L2, a second switch component Q2 and a second fast recovery diode D2. The second switch component Q2 such as an emitter of a second Insulated Gate Bipolar Transistor (IGBT for short) is connected to the first switch component Q1 such as an emitter of a first IGBT, and a first node J1 is between the two switch components. Therefore, according to an embodiment of the present disclosure, as shown in FIG. 1, the first switch component Q1 and the second switch component Q2 are IGBTs, and the emitter of the first IGBT is connected to the emitter of the second IGBT, and the first node J1 is between the emitter of the first IGBT and the emitter of the second IGBT. Certainly, in other embodiments of the present disclosure, the first switch component Q1 and the second switch component Q2 may also be Metal Oxide Semiconductor (MOS for short) transistors, and the first node J1 is between a source of the first MOS transistor and a source of the second MOS transistor.

In detail, according to an example of the present disclosure, an inductance value of each of the first energy storage inductor L1 and the second energy storage inductor L2 is in a range of 100 uH to 9 mH.

As shown in FIG. 1, a first terminal of the current sampling resistor R1 is connected to the first node J1 and a second terminal of the current sampling resistor R2 is grounded. The current sampling resistor R1 generates respective corresponding sampling signals according to a current flowing through the first switch component Q1, a current flowing through the second switch component Q2, and a total current flowing through the first switch component Q1 and the second switch component Q2. The current detection component 30 is connected to the first node J1. The current detection component 30 is configured to detect a current I1 flowing through the first switch component Q1, a current I2 flowing through the second switch component Q2 and a total current Iin flowing through the first switch component Q1 and the second switch component Q2 based on sampling signals generated by the current sampling resistor R1. The voltage detection component 40 is configured to detect a voltage U1 inputted into the interleaved power factor corrector 1 and an output voltage U2 of the interleaved power factor corrector 1. The control component 50 is connected to the current detection component 30, the voltage detection component 40, a control terminal of the first switch component Q1 and a control terminal of the second switch component Q2 respectively. The control component 50 is configured to generate a first PWM control signal for controlling the first switch component Q1 and a second PWM control signal for controlling the second switch component Q2 based on the current I1, the current I2, the current Iin, the voltage U1, the voltage U2 and a preset target output voltage Vref. The first PWM control signal and the second PWM control signal has the same carrier period, and the first PWM control signal is different from the second PWM control signal by a half of the carrier period.

It should be noted that, in an embodiment of the present disclosure, the first PFC component 10 and the second PFC component 20 constitute the two-way symmetrical boost-type circuit. In addition, the current detection component 30 may convert the analog current I1, the analog current I2, and the analog current Iin into digital values by AD conversion and output the digital values to the control component 50. Similarly, the voltage detection component 40 may convert the analog voltage U1 and the analog voltage U2 into digital values by the AD conversion and output the digital values to the control component 50.

In detail, in an embodiment of the present disclosure, as shown in FIG. 1, an input terminal of the interleaved power factor corrector 1 may be connected to a rectifier bridge 60, and an output terminal of the interleaved power factor corrector 1 may be connected to the electric device 70. The rectifier bridge 60 is configured to perform rectification on alternating current (AC for short) output from an AC source. A first output terminal of the rectifier bridge 60 is connected to a first terminal of the first energy storage inductor L1 and a first terminal of the second energy storage inductor L2 respectively, and a second output terminal of the rectifier bridge 60 is connected to ground. A second terminal of the first energy storage inductor L1 is connected to a collector of the first switch component Q1 and an anode of the first fast recovery diode D1 respectively. A cathode of the first fast recovery diode D1 is connected to a first terminal of the electric device 70. A second terminal of the second energy storage inductor L2 is connected to a collector of the second switch component Q2 and an anode of the second fast recovery diode D2 respectively. A cathode of the second fast recovery diode D2 is connected to the first terminal of the electric device 70. A second terminal of the electric device 70 is connected to ground. The first switch component Q1 is turned on and off according to the first PWM controls signal, and the second switch component Q2 is turned on and off according to the second PWM control signal, so as to realize power factor correction and harmonic suppression on the input current of the electric device 70 and to realize current balance control on the first switch component Q1 and the second switch component Q2.

Further, in an embodiment of the present disclosure, as shown in FIG. 1, the interleaved power factor corrector 1 further includes a first voltage sampling component 90 and a second voltage sampling component 100. The first voltage sampling component 90 may include a second resistor R2 and a third resistor R3 connected in series. A second node J2 is between the second resistor R2 and the third resistor R3. A first terminal of the second resistor R2 is connected to the first output terminal of the rectifier bridge 60, and a first terminal of the third resistor R3 is connected to ground. A first input terminal of the voltage detection component 40 is connected to the second node J2. The voltage detection component 40 is configured to detect the voltage U1 inputted into the interleaved power factor corrector 1 based on signals sampled by the first voltage sampling component 90. The second voltage sampling component 100 may include a fourth resistor R4 and a fifth resistor R5 connected in series. A third node J3 is between the fourth resistor R4 and the fifth resistor R5. A first terminal of the fourth resistor R4 is connected to the cathode of the first fast recovery diode D1 and the cathode of the second fast recovery diode D2 respectively, and a first terminal of the fifth resistor R5 is connected to ground. A second input terminal of the voltage detection component 40 is connected to the third node J3. The voltage detection component 40 is configured to detect the output voltage U2 of the interleaved power factor corrector 1 based on signals sampled by the second voltage sampling component 100.

Therefore, when the interleaved power factor corrector 1 in embodiments of the present disclosure detects the current I1 flowing through the first switch component Q1, the current I2 flowing through the second switch component Q2, the total current Iin flowing through the first switch component Q1 and the second switch component Q2, the voltage U1 inputted into the interleaved power factor corrector 1 and the output voltage U2 of the interleaved power factor corrector 1, it may be realized by corresponding signal processing by using only a few simple sampling resistors such as R1, R2, R3, R4, R5, the current detection component 30 and the voltage detection component 40, thereby reducing the circuit cost greatly.

Further, in an embodiment of the present disclosure, when a turn-on period of the first switch component Q1 and a turn-on period of the second switch component Q2 do not have an overlapping part, the current detection component 30 is configured to detect the current I1 when the first switch component Q1 is in a turn-on status, and to detect the current I2 when the second switch component Q2 is in a turn-on status, and to calculate the current Iin based on the current I1 and the current I2.

Figure 2:
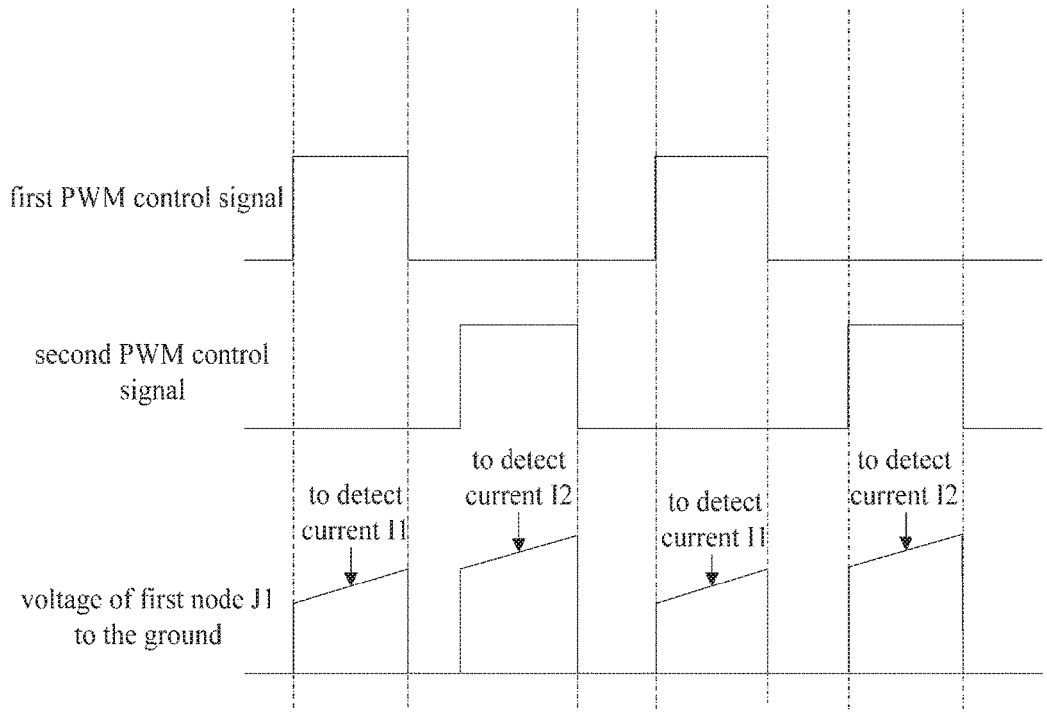
FIG. 2 is a schematic diagram illustrating detecting currents in an interleaved power factor corrector according to an embodiment of the present disclosure.

In detail, in an embodiment of the present disclosure, as shown in FIG. 2, the current detection component 30 may detect the voltage of the first node J1 to the ground when the first switch component Q1 is at a middle point of the turn-on period and use the detected value as the current I1; and may detect the voltage of the first node J1 to the ground when the second switch component Q2 is at a middle point of the turn-on period and use the detected value as the current I2. Further, the current Iin=I1+I2.

Further, in another embodiment of the present disclosure, when a turn-on period of the first switch component Q1 is partially overlapped with a turn-on period of the second switch component Q2, the current detection component 30 is configured to detect the current I1 when the first switch component Q1 is in a turn-on status and the second switch component Q2 is in a turn-off status, and to detect the current I2 when the second switch component Q2 is in a turn-on status and the first switch component Q1 is in a turn-off status, and to calculate the current Iin based on the current I1 and the current I2. Or, the current detection component 30 is configured to detect the current I1 when the first switch component Q1 is in a turn-on status and the second switch component Q2 is in a turn-off status, and to detect the current I2 when the second switch component Q2 is in a turn-on status and the first switch component Q1 is in a turn-off status, and to detect the current Iin when the first switch component Q1 is in the turn-on status and the second switch component Q2 is in the turn-on status. Or, the current detection component 30 is configured to detect the current I1 when the first switch component Q1 is in a turn-on status and the second switch component Q2 is in a turn-off status, and to detect the current Iin when the first switch component Q1 is in the turn-on status and the second switch component Q2 is in a turn-on status, and to calculate the current I2 based on the current I1 and the current Iin. Or, the current detection component 30 is configured to detect the current I2 when the second switch component Q2 is in a turn-on status and the first switch component Q1 is in a turn-off status, and to detect the current Iin when the first switch component Q1 is in a turn-on status and the second switch component Q2 is in the turn-on status, and to calculate the current I1 based on the current I2 and the current Iin.

Figure 3:
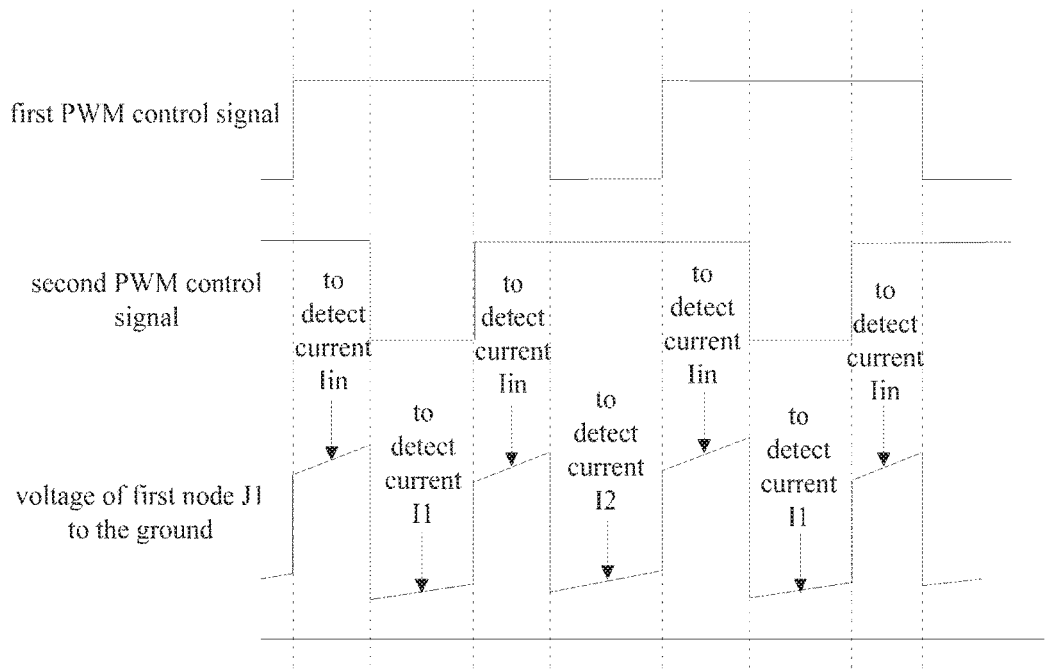
FIG. 3 is a schematic diagram illustrating detecting currents in an interleaved power factor corrector according to another embodiment of the present disclosure.

In detail, in an embodiment of the present disclosure, as shown in FIG. 3, the current detection component 30 may detect the voltage of the first node J1 to the ground when the first switch component Q1 is at a middle point of the turn-on period and use the detected value as the current I1; and may detect the voltage of the first node J1 to the ground when the second switch component Q2 is at a middle point of the turn-on period and uses the detected value as the current I2; and may detect the voltage of the first node J1 to the ground when the first switch component Q1 and the second switch component Q2 are at a middle point of respective turn-on periods, and use the detected value as the current Iin.

Further, in still another embodiment of the present disclosure, under steady-state conditions, a turn-on period of the first switch component Q1 may completely overlap with a turn-on period of the second switch component Q2 when an input current of the first switch component Q1 and an input current of the second switch component Q3 are close to zero. When the turn-on period of the first switch component Q1 completely overlaps with the turn-on period of the second switch component Q2, the current detecting component 30 may detect the current Iin only and cannot detect the current I1 and the current I2.

Figure 4:
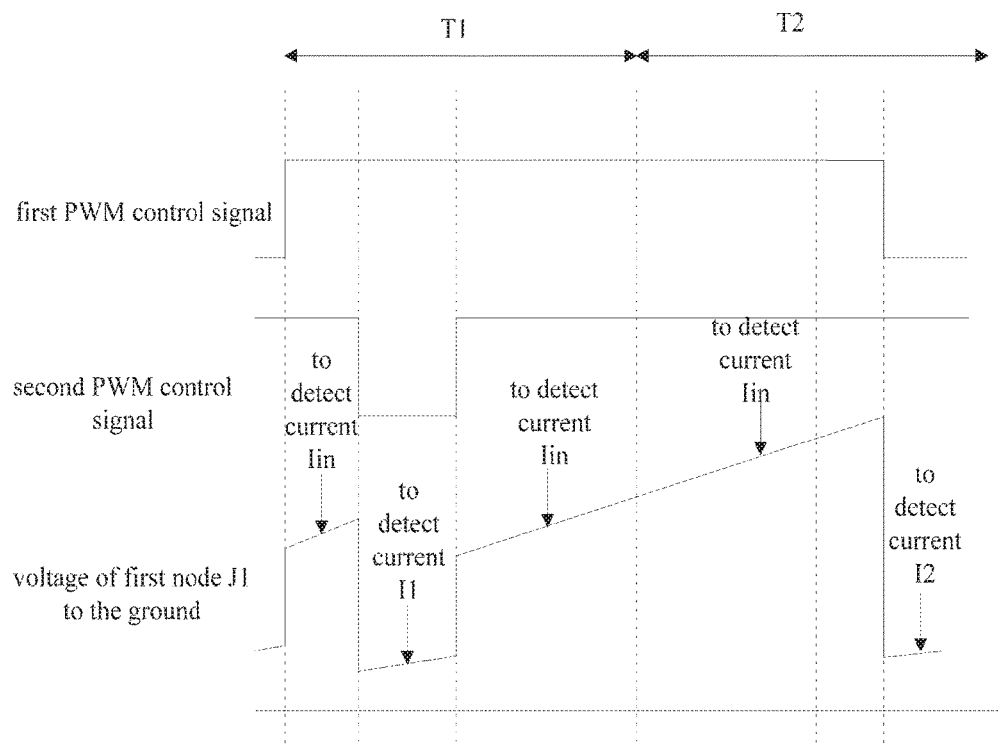
FIG. 4 is a schematic diagram illustrating detecting currents in an interleaved power factor corrector according to still another embodiment of the present disclosure.

For example, in an embodiment of the present disclosure, as shown in FIG. 4, when both the first switch component Q1 and the second switch component Q2 are in the turn-on status, the voltage of the first node J1 to the ground is detected when the first switch component Q1 is at a middle point of the turn-on period, or the voltage of the first node J1 to the ground is detected when the second switch component Q2 is at a middle point of the turn-on period, and both the detected values are the current Iin. T1 is the first carrier period and T2 is the second carrier period. However, since the input currents of the first switch component Q1 and the second switch component Q2 are close to zero at this time, it does not need to consider the current balance of the first switch component Q1 and the second switch component Q2. In fact, the probability that the turn-on period of the first switch component Q1 completely overlaps with the turn-on period of the second switch component Q2 is very low and it does not affect overall effect of current balance control performed by the interleaved power factor corrector 1 in embodiments of the present disclosure on the first switch component Q1 and the second switch component Q2.

It should be noted that, in FIG. 2, FIG. 3 and FIG. 4, the first switch component Q1 is turned on when the first PWM control signal is at the high level, the first switch component Q1 is turned off when the first PWM control signal is at the low level, the second switch component Q2 is turned on when the second PWM control signal is at the high level, and the second switch component Q2 is turned off when the second PWM control signal is at the low level.

Figure 5:
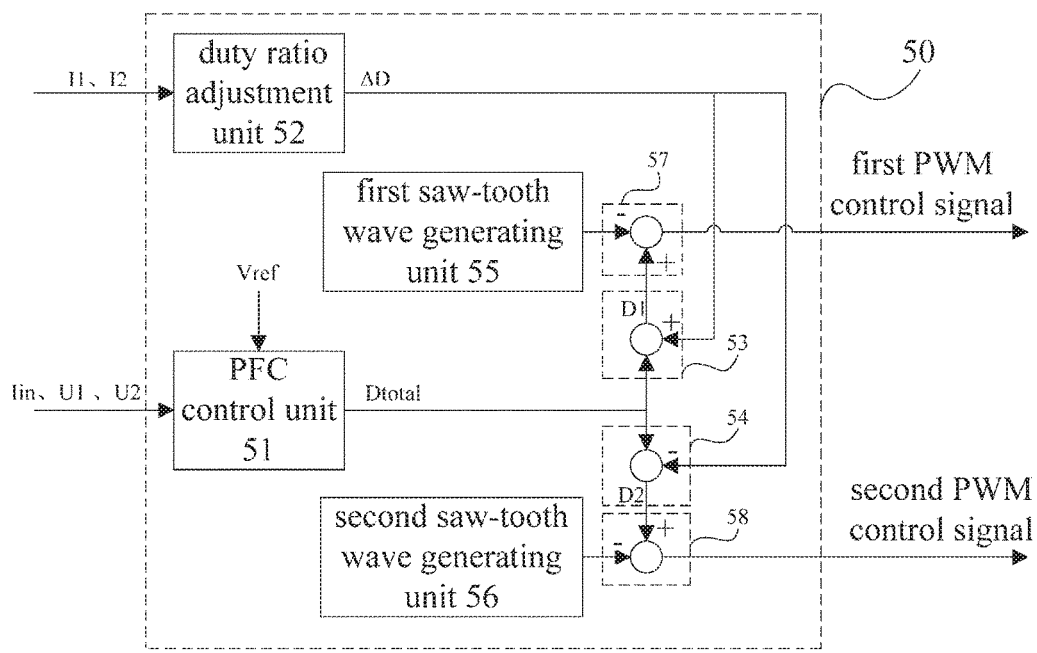
FIG. 5 is a schematic diagram illustrating a control component of an interleaved power factor corrector according to an embodiment of the present disclosure.

Further, in an embodiment of the present disclosure, as shown in FIG. 5, the control component 50 further includes a PFC control unit 51, a duty ratio adjustment unit 52, a first calculating unit 53, a second calculating unit 54, a first saw-tooth wave generating unit 55, a second saw-tooth wave generating unit 56, a first PWM control signal generating unit 57, and a second PWM control signal generating unit 58. According to single-cycle algorithm or average current method or the like, in each carrier cycle (in each carrier cycle of the first switch component Q1 and in each carrier cycle of the second switch component Q2), the PFC control unit 51 may generate a first duty ratio signal based on the current Iin, the voltage U1, the voltage U2, and the preset target output voltage Vref. The duty ratio adjustment unit 52 is configured to calculate a duty ratio adjustment value based on the current I1 and the current I2. The first calculating unit 53 is configured to calculate a duty ratio signal of the first switch component Q1 based on the first duty ratio signal and the duty ratio adjustment value. The second calculating unit 54 is configured to calculate a duty ratio signal of the second switch component Q2 based on the first duty ratio signal and the duty ratio adjustment value. The first saw-tooth wave generating unit 55 is configured to output a first saw-tooth wave signal. The second saw-tooth wave generating unit 56 is configured to output a second saw-tooth wave signal. The first PWM control signal generating unit 57 is configured to generate the first PWM control signal based on the duty ratio signal of the first switch component Q1 and the first saw-tooth wave signal. The second PWM control signal generating unit 58 is configured to generate the second PWM control signal based on the duty ratio signal of the second switch component Q2 and the second saw-tooth signal.

Further, in an embodiment of the present disclosure, the duty ratio adjustment unit 52 may include a PID controller. The PID controller may calculate the duty ratio adjustment value based on a different of the current I1 and the current I2. In detail, in an embodiment of the present disclosure, the duty ratio adjustment unit 52 may calculate the duty ratio adjustment value by a formula of $$\begin{cases} \text{Sum}(k) = \text{Sum}(k-1) + (I2(k) - I1(k)) \cdot T \\ \Delta D = Kp \cdot (I2(k) - I1(k)) + Ki \cdot \text{Sum}(k) \end{cases},$$

where, Sum(k) is an integral value calculated for the $k^{th}$ carrier period, Sum(k-1) is an integral value calculated for the $(k-1)^{th}$ carrier period, k is an integer greater than or equal to 1, $I1(k)$ and $I2(k)$ are sample values of the current I1 and the current I2 for the $k^{th}$ carrier period respectively, T is a length of the carrier period, Kp and Ki are a proportional control coefficient and an integral control coefficient respectively, and $\Delta D$ is the duty ratio adjustment value.

It should be noted that, when the turn-on period of the first switch component Q1 completely overlaps with the turn-on period of the second switch component Q2, the current detecting component 30 may detect the current Iin only and cannot detect the current I1 and the current I2. At this time, the duty ratio adjustment value $\Delta D$ cannot be calculated based on the above formula, and the duty ratio adjustment value $\Delta D$ of the current carrier period is not updated and is maintained as the duty ratio adjustment value $\Delta D$ of the previous carrier period.

Further, in an embodiment of the present disclosure, the duty ratio signal of the first switch component Q1 and the duty ratio signal of the second switch component Q2 may be calculated by a formula of $$\begin{cases} D1 = Dtotal + \Delta D \\ D2 = Dtotal - \Delta D \end{cases},$$

where, D1 is the duty ratio signal of the first switch component Q1, D2 is the duty ratio signal of the second switch component Q2, Dtotal is the first duty ratio signal and $\Delta D$ is the duty ratio adjustment value.

Further, in an embodiment of the present disclosure, the first saw-tooth wave signal may be presented by a formula of $$F(t)=[t-(k-1)T]/T, (k-1)T<t\leq kT$$

where, F(t) is the first saw-tooth wave signal, T is a length of the carrier period, T is in a range from 10 microseconds to 60 microseconds, and k is an integer greater than or equal to 1.

Further, in an embodiment of the present disclosure, the second saw-tooth wave signal may be presented as F(t–T/2). The second saw-tooth signal is different from the first saw-tooth signal by T/2.

Figure 6:
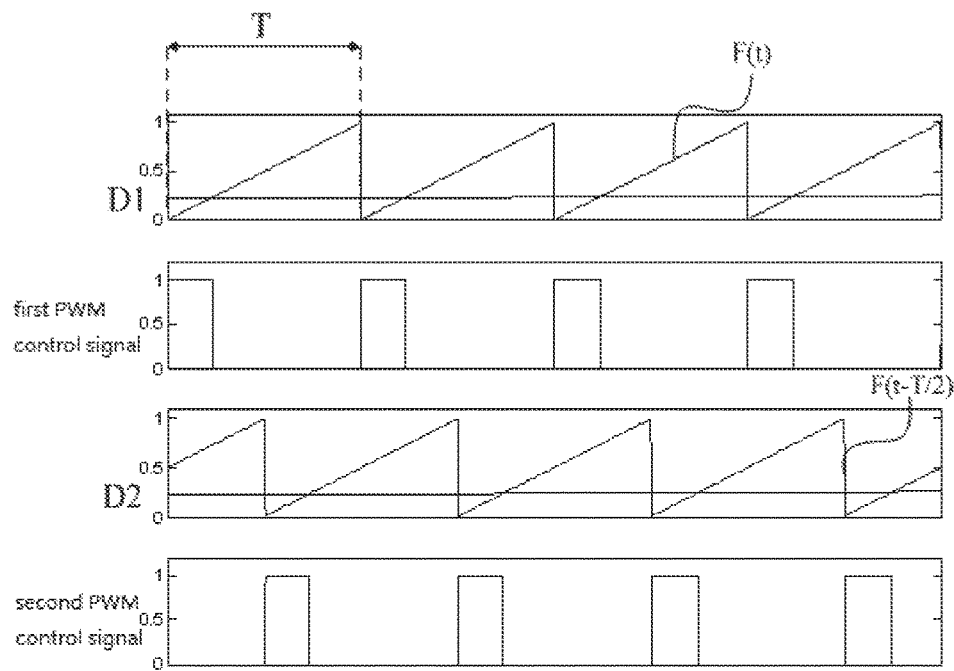
FIG. 6 is a schematic diagram illustrating a duty radio signal, a saw-tooth wave signal and a PWM control signal of an interleaved power factor corrector according to an embodiment of the present disclosure.

Further, as shown in FIG. 6, in an embodiment of the present disclosure, the first PWM control signal generating unit 57 is configured to output 1 if a difference between the duty ratio signal D1 of the first switch component Q1 and the first saw-tooth wave signal F(t) is greater than 0, and to output 0 if the difference between the duty ratio signal D1 of the first switch component Q1 and the first saw-tooth wave signal F(t) is less than or equal to 0. The second PWM control signal generating unit 58 is configured to output 1 if a difference between the duty ratio signal D2 of the second switch component Q2 and the second saw-tooth wave signal F(t–T/2) is greater than 0, and to output 0 if the difference between the duty ratio signal D2 of the second switch component Q2 and the second saw-tooth wave signal F(t−T/2) is less than or equal to 0. It may be seen from FIG. 6 that, the first PWM control signal and the second PWM control signal have the same carrier period and have a difference by a half of the carrier period. In each carrier period, each of the first PWM control signal and the second PWM control signal outputs high level once, such that each of the first switch component Q1 and the second switch component Q2 is turned on once during each carrier cycle, thereby greatly increasing the number of turn-ons of the first switch component Q1 and the second switch component Q2, and suppressing effectively the input current harmonics of the electric device 70.

Figure 7:
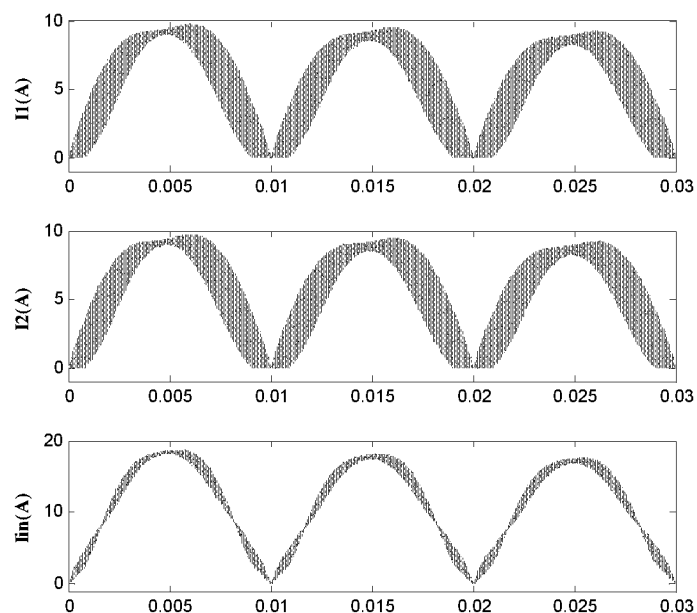
FIG. 7 is a schematic diagram illustrating waveforms of output currents of an interleaved power factor corrector according to an embodiment of the present disclosure.

FIG. 7 is a schematic diagram illustrating waveforms of output currents of an interleaved power factor corrector according to an embodiment of the present disclosure. It may be seen from FIG. 7 that, the ripple of the current Iin is significantly smaller than the ripple of the current I1 and the ripple of the current I2, and the current I1 and the current I2 can be substantially consistent with each other due to the balance control on the current I1 and the current I2. In addition, after a large number of experiments are conducted on the electric device with the interleaved power factor corrector provided in embodiments of the present disclosure, experimental results show that the power factor of the electric device with the interleaved power factor corrector provided in embodiments of the present disclosure may reach more than 99%, and the input current harmonics has also been effectively suppressed and may meet the harmonics standards.

With the interleaved power factor corrector provided in embodiments of the present disclosure, after the current detection component detects the current I1 flowing through the first switch component of the first PFC component, the current I2 flowing through the second switch component of the second PFC component, and the current Iin flowing through the first switch component and the second switch component, and after the voltage detection component detects the voltage U1 inputted into the interleaved power factor corrector and the output voltage U2 of the interleaved power factor corrector, the control component generates the first PWM control signal for controlling the first switch component and the second PWM control signal for controlling the second switch component (the first PWM control signal is different from the second PWM control signal by a half of the carrier period) based on the current I1, the current I2, the current Iin, the voltage U1, the voltage U2 and the preset target output voltage. The interleaved power factor corrector may perform the current balance control on the current I1 of the first switch component and the current I2 of the second switch component by adopting the current sampling resistor only, thereby saving the circuit cost greatly and having good power factor correction performance, current balance control performance and current harmonic suppression effect.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. An interleaved power factor corrector, comprising:
 a first power factor correction (PFC) component comprising a first energy storage inductor, a first switch component and a first fast recovery diode;
 a second PFC component, parallel to the first PFC component and comprising a second energy storage inductor, a second switch component and a second fast recovery diode, wherein the second switch component is connected to the first switch component and a first node is between the second switch component and the first switch component;
 a current sampling resistor, wherein a first terminal of the current sampling resistor is connected to the first node and a second terminal of the current sampling resistor is grounded;
 a current detection component, connected to the first node and configured to detect a current I1 flowing through the first switch component, to detect a current I2 flowing through the second switch component and to detect a current Iin flowing through the first switch component and the second switch component, each detection is based on a sampling signal generated by the current sampling resistor;
 a voltage detection component, configured to detect a voltage U1 inputted into the interleaved power factor corrector and an output voltage U2 of the interleaved power factor corrector; and
 a control component, connected to the current detection component, the voltage detection component, a control terminal of the first switch component and a control terminal of the second switch component respectively and configured to generate a first pulse-width modulation (PWM) control signal for controlling the first switch component and a second PWM control signal for controlling the second switch component based on the current I1, the current I2, the current Iin, the voltage U1, the voltage U2 and a preset target output voltage, wherein the first PWM control signal is different from the second PWM control signal by a half of a carrier period;
 wherein the control component further comprises:
 a PFC control unit, configured to generate a first duty ratio signal in each carrier cycle based on the current Iin, the voltage U1, the voltage U2, and the preset target output voltage;
 a duty ratio adjustment unit, configured to calculate a duty ratio adjustment value based on the current I1 and the current I2;
 a first calculating unit, configured to calculate a duty ratio signal of the first switch component based on the first duty ratio signal and the duty ratio adjustment value;
 a second calculating unit, configured to calculate a duty ratio signal of the second switch component based on the first duty ratio signal and the duty ratio adjustment value;

a first saw-tooth wave generating unit, configured to output a first saw-tooth wave signal;

a second saw-tooth wave generating unit, configured to output a second saw-tooth wave signal;

a first PWM control signal generating unit, configured to generate the first PWM control signal based on the duty ratio signal of the first switch component and the first saw-tooth wave signal; and a second PWM control signal generating unit, configured to generate the second PWM control signal based on the duty ratio signal of the second switch component and the second saw-tooth signal.

2. The interleaved power factor corrector according to claim 1, wherein when a turn-on period of the first switch component and a turn-on period of the second switch component do not have an overlapping part, the current detection component is configured to detect the current I1 when the first switch component is in a turn-on status, and to detect the current I2 when the second switch component is in a turn-on status, and to calculate the current Iin based on the current I1 and the current I2.

3. The interleaved power factor corrector according to claim 1, wherein when a turn-on period of the first switch component is partially overlapped with a turn-on period of the second switch component, the current detection component is configured to detect the current I1 when the first switch component is in a turn-on status and the second switch component is in a turn-off status, and to detect the current I2 when the second switch component is in a turn-on status and the first switch component is in a turn-off status, and to calculate the current Iin based on the current I1 and the current I2.

4. The interleaved power factor corrector according to claim 1, wherein the duty ratio adjustment unit is configured to calculate the duty ratio adjustment value by a formula of $$\begin{cases} Sum(k) = Sum(k-1) + (I2(k) - I1(k)) \cdot T \\ \Delta D = Kp \cdot (I2(k) - I1(k)) + Ki \cdot Sum(k) \end{cases},$$

where, $Sum(k)$ is an integral value calculated for the $k^{th}$ carrier period, $Sum(k-1)$ is an integral value calculated for the $(k-1)^{th}$ carrier period, k is an integer greater than or equal to 1, $I1(k)$ and $I2(k)$ are sample values of the current I1 and I2 for the $k^{th}$ carrier period respectively, T is a length of the carrier period, Kp and Ki are a proportional control coefficient and an integral control coefficient respectively, and $\Delta D$ is the duty ratio adjustment value.

5. The interleaved power factor corrector according to claim 1, wherein the duty ratio signal of the first switch component and the duty ratio signal of the second switch component are calculated by a formula of $$\begin{cases} D1 = Dtotal + \Delta D \\ D2 = Dtotal - \Delta D \end{cases},$$

where, D1 is the duty ratio signal of the first switch component, D2 is the duty ratio signal of the second switch component, Dtotal is the first duty ratio signal and $\Delta D$ is the duty ratio adjustment value.

6. The interleaved power factor corrector according to claim 1, wherein the first saw-tooth wave signal is presented by a formula of $$F(t) = [t-(k-1)T]/T, \ (k-1)T < t \leq kT$$

where, F(t) is the first saw-tooth wave signal, T is a length of the carrier period, and k is an integer greater than or equal to 1.

7. The interleaved power factor corrector according to claim 6, wherein the second saw-tooth wave signal is presented by a formula of $$F(t-T/2)$$

where, the second saw-tooth signal is different from the first saw-tooth signal by T/2.

8. The interleaved power factor corrector according to claim 1, wherein the first PWM control signal generating unit is configured to output 1 if a difference between the duty ratio signal of the first switch component and the first saw-tooth wave signal is greater than 0, and to output 0 if the difference between the duty ratio signal of the first switch component and the first saw-tooth wave signal is less than or equal to 0; and the second PWM control signal generating unit is configured to output 1 if a difference between the duty ratio signal of the second switch component and the second saw-tooth wave signal is greater than 0, and to output 0 if the difference between the duty ratio signal of the second switch component and the second saw-tooth wave signal is less than or equal to 0.

9. The interleaved power factor corrector according to claim 1, wherein each of the first switch component and the second switch component is an insulated-gate bipolar-transistor (IGBT), and an emitter of the first IGBT is connected to an emitter of the second IGBT, and the first node is between the emitter of the first IGBT and the emitter of the second IGBT.

10. The interleaved power factor corrector according to claim 1, wherein when a turn-on period of the first switch component is partially overlapped with a turn-on period of the second switch component, the current detection component is configured to detect the current I1 when the first switch component is in a turn-on status and the second switch component is in a turn-off status, and to detect the current I2 when the second switch component is in a turn-on status and the first switch component is in a turn-off status, and to detect the current Iin when the first switch component is in the turn-on status and the second switch component is in the turn-on status.

11. The interleaved power factor corrector according to claim 1, wherein when a turn-on period of the first switch component is partially overlapped with a turn-on period of the second switch component, the current detection component is configured to detect the current I1 when the first switch component is in a turn-on status and the second switch component is in a turn-off status, and to detect the current Iin when the first switch component is in the turn-on status and the second switch component is in a turn-on status, and to calculate the current I2 based on the current I1 and the current Iin.

12. The interleaved power factor corrector according to claim 1, wherein when a turn-on period of the first switch component is partially overlapped with a turn-on period of the second switch component, the current detection component is configured to detect the current I2 when the second switch component is in a turn-on status and the first switch component is in a turn-off status, and to detect the current Iin when the first switch component is in a turn-on status and the second switch component is in the turn-on status, and to calculate the current I1 based on the current I2 and the current Iin.

13. The interleaved power factor corrector according to claim 1, further comprising: a first voltage sampling component and a second voltage sampling component, wherein the first voltage sampling component comprises a second resistor and a third resistor connected in series, a second node is between the second resistor and the third resistor, a first input terminal of the voltage detection component is connected to the second node, and the voltage detection component is configured to detect the voltage U1 inputted into the interleaved power factor corrector based on signals sampled by the first voltage sampling component;

the second voltage sampling component comprises a fourth resistor and a fifth resistor connected in series, a third node is between the fourth resistor and the fifth resistor, a second input terminal of the voltage detection component is connected to the third node, and the voltage detection component is configured to detect the output voltage of the interleaved power factor corrector based on signals sampled by the second voltage sampling component.

* * * * *